Jan. 24, 1956 A. H. RISCH 2,732,119
MOLDED PULP BAIT CONTAINER
Filed Aug. 9, 1952
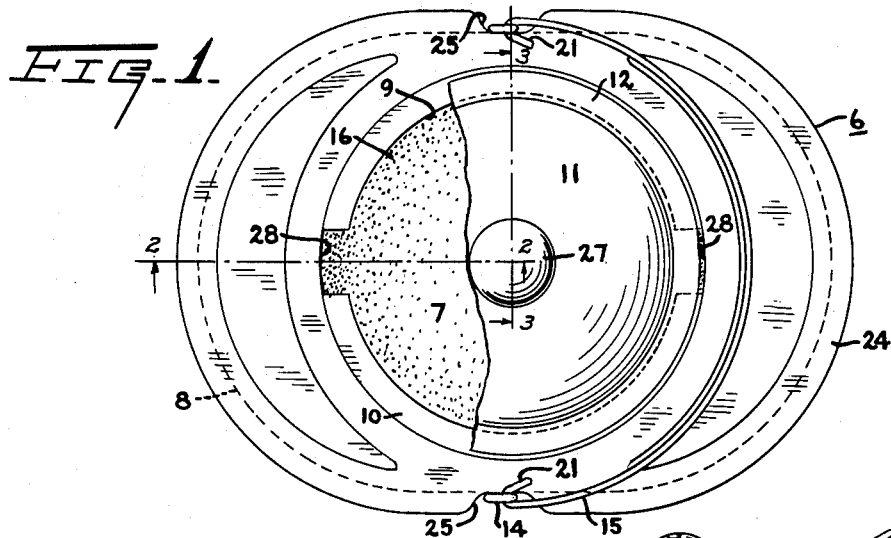
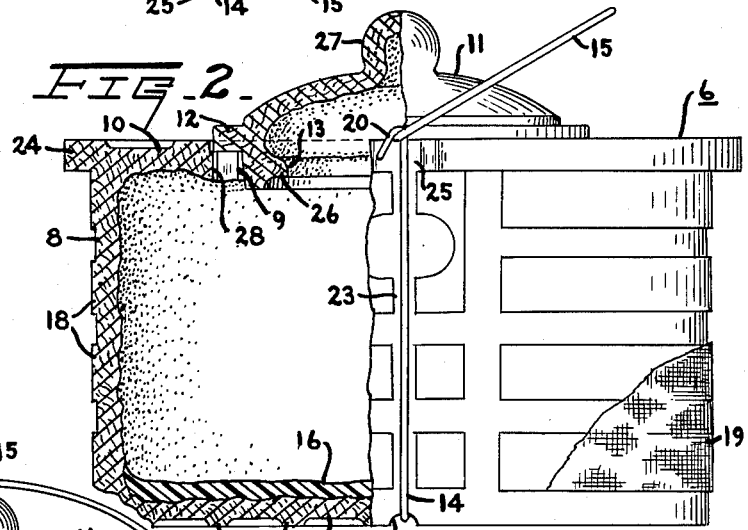
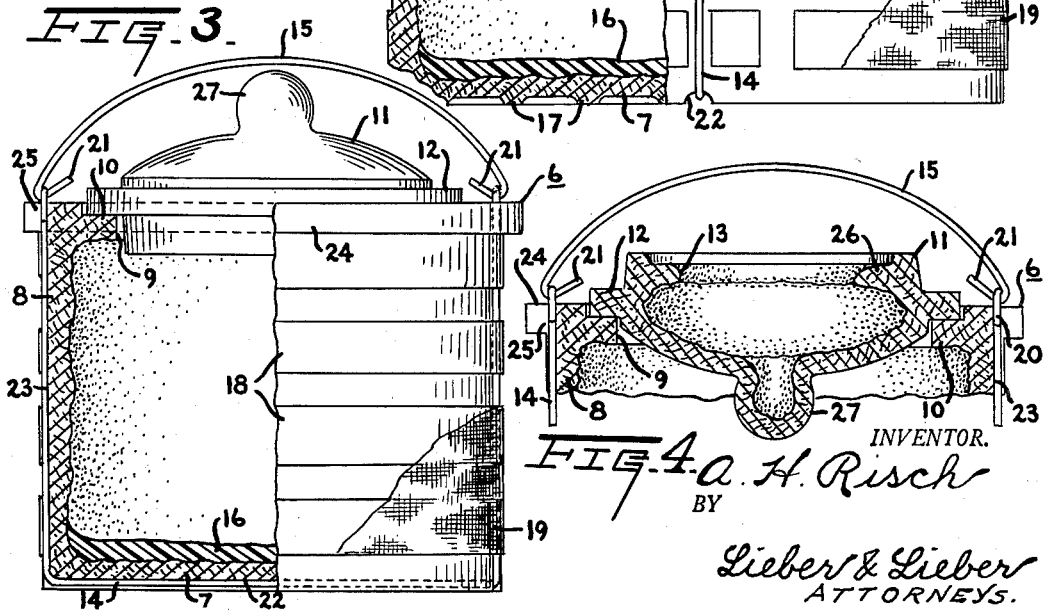
INVENTOR.
A. H. Risch
BY
Lieber & Lieber
ATTORNEYS.

United States Patent Office 2,732,119
Patented Jan. 24, 1956

2,732,119

MOLDED PULP BAIT CONTAINER

Arthur H. Risch, Wauwatosa, Wis., assignor to Pulp Reproduction Company, Milwaukee, Wis., a corporation of Wisconsin Application August 9, 1952, Serial No. 303,509

1 Claim. (Cl. 229—2.5)

The present invention relates generally to improvements in the art of fishing, and relates more particularly to improvements in the construction and use of molded pulp minnow and other live bait containers.

A primary object of the present invention is to provide an improved live bait bucket or the like which may be readily produced from light weight fibrous material such as molded paper pulp and which is nevertheless exceedingly strong and durable in construction.

Various attempts have heretofore been made to produce a suitable minnow bucket from light weight pulp or the like. However, all of these attempts have proven unsuccessful for various reasons. One of the principal reasons for the failure of these prior devices to obtain satisfactory commercial acceptance has been due to the inability to provide a bucket or bait container of sufficiently durable construction to satisfactorily withstand the abuse to which such devices are normally subjected. In addition, the prior pump minnow containers were too costly and limited in use and were inadequately sealed and water-proofed to effectively retain the contents in a sufficiently cool and protected state for the relatively long periods of time required in normal use while providing aeration of the contents. Also, the single purpose prior pulp minnow buckets were provided with inadequate and makeshift means for carrying and transporting the same in a convenient and practical manner and additionally were formed with generally unsatisfactory covers.

It is therefore a more specific object of my present invention to provide an improved molded pulp live bait container for fishermen which obviates all of the objections and disadvantages heretofore attendant devices of this general type.

Another specific object of this invention is to provide an improved minnow bucket or container in which the walls are formed of a material possessing extremely good insulation qualities so as to maintain relatively constant temperatures within the container over long periods of time, and in which means are provided for additional cooling when desired.

Another specific object of the invention is to provide an improved live bait container formed of molded paper pulp which effectively retains desired quantities of water therein while nevertheless permitting entrance of air thereto from the exterior to the interior for efficient aeration of the contents.

A further specific object of my invention is to provide an improved live bait container for fishermen having a highly efficient novel cover which is adapted to serve a multiple purpose and which may be protectively housed entirely within the main body of the container when not in use.

An additional specific object of my present invention is to provide a new and improved highly efficient portable live bait container which may be readily produced in large quantities and at exceedingly low cost from available molded paper pulp and which is moreover provided with novel, inexpensive and practical carrying means for convenient transportation thereof.

Still another specific object of the present invention is to provide an improved live bait container comprising, a molded pulp receptacle adapted to receive and retain a supply of water, the receptacle having a restricted upper access opening, and a hollow molded pulp cover for the receptacle formed for reversible cooperation with the opening and having an access opening to the interior thereof.

These and other specfic objects and advantages of the present invention will be apparent from the following detailed description.

A clear conception of the several features constituting my present invention, and of the mode of constructing and of utilizing typical molded pulp live bait containers embodying the improvements, may be had by referring to the drawing accompanying and forming a part of this specification, wherein like reference characters designate the same or similar parts in the several views.

Fig. 1 is a top view of a typical live bait container formed of molded pulp and embodying the present invention, a portion of the cover being broken away to more clearly reveal normally hidden structure and the upper gripping and carrying bail being shown in partially lowered position;

Fig. 2 is a fragmentary side view of the device, a section having been taken through a portion of the receptacle and cover along the line 2—2 of Fig. 1 and a fragment of an outer protective screen for the side wall being shown;

Fig. 3 is an end view of the device, a section having been taken through a portion of the receptacle along the line 3—3 of Fig. 1 and a fragment of the outer protective screen also being shown; and Fig. 4 is a transverse vertical section through the upper portion of the receptacle and cover, the cover being shown in inverted position for receiving diverse materials.

While the invention has been specifically shown and described herein as being especially applicable to a molded paper pulp container advantageously adapted for preserving live minnows and being of a particular configuration with a cover of normally dome shape covering a circular upper access opening, it is not desired or intended to thereby unnecessarily limit or restrict the scope or utility thereof, since the invention may obviously be advantageously applicable to containers of diverse shapes for housing and preserving diverse types of baits and other articles; and it is also contemplated that certain specific descriptive terms utilized herein shall be given the broadest possible interpretation consistent with the disclosure.

Referring to the drawing, the typical live bait container shown therein as embodying the invention comprises, in general, a hollow body 6 of paper pulp or similar fibrous material molded to form a bucket-like receptacle having integral bottom and side walls 7, 8 respectively, the recepticle 6 having a restricted upper access opening 9 formed by an inwardly directed integral flange 10; a hollow dome-shaped cover 11 also of paper pulp molded to form an integral unit adapted for reversible cooperation with the opening 9 of the receptacle 6 to close the same, the cover 11 being provided with an integral outwardly directed flange 12 formed for reversible direct seating cooperation with the flange 10 and having a restricted access opening 13 to the interior thereof on the side opposed to the dome; and carrying means for the container formed by a pair of cooperating generally U-shaped bails 14, 15, the bail 14 snugly outwardly engaging the bottom and opposite side walls 7, 8 respectively of the receptacle 6 and the other bail 15 having its legs secured to the legs of the bail 14 and spanning the top of the receptacle to provide gripping means.

The walls 7, 8 and flange 10 of the receptacle 6 are formed relatively thick for purposes of rigidity and durability; and while the side walls 8 are left uncoated so as to permit filtration of air therethrough due to the porous nature of the material, these walls are relatively impermeable to more heavily bodied liquids such as water and do not permit escape thereof from within the receptacle 6. However, to reinforce the bottom wall 7 and aid in sustaining the weight of the water normally carried within the receptacle, a relatively heavy or thick coating 16 of waterproof sealing and reinforcing material such as asphalt or tar is dispersed in a layer over the inner surface of the bottom wall 7. Also to add durability to the receptacle, it has been found advantageous to form the bottom wall 7 with a series of spaced outer reinforcing ribs 17 and the side wall 8 with another series of spaced outer reinforcing ribs 18; and to prevent scuffing and marring of the relatively soft-bodied walls, a protective outer screen 19 or the like may be provided over the exterior of the receptacle.

An important feature of the invention is in the specific construction of the cooperating bails 14, 15 providing the carrying means for the container, the ends of the respective bails 14, 15 being reversely bent to provide cooperating interlocking hooks 20, 21 respectively which permits pivotal movement of the upper bail 15 from an upright carrying position to an inactive position substantially parallel to the plane of the top flange 10 of the receptacle 6. To prevent displacement of the bails 14, 15 and maintain the same in effective cooperative relationship, the bottom wall 7 of the receptacle 6 is provided with an outwardly open groove 22 extending transversely thereacross, and the transverse leg of the bail 14 is recessed in this bottom wall groove 22 thus preventing displacement of the bail without adversely effecting the stability of the unit. Also, it has been found highly advantageous to provide the continuous side wall 8 with diametrically opposite outwardly open vertical side wall grooves 23 joining at their lower ends with the opposite ends of the bottom groove 22, the upwardly extending legs of the bail 14 being recessed in these grooves 23 to aid in positively preventing displacement of the bail; and to provide a suitable seat for each of the hooked ends 20 of the bail 14 and aid in preventing unintentional release of the interlocked hooks 20, 21 the receptacle 6 is preferably formed with an integral outwardly flaring upper flange 24 which is provided with diametrically opposite outwardly open notches 25 for receiving the hooked ends 20 of the bail 14 as shown.

The specific construction of the hollow cover 11 is another important feature of the invention since it is formed for reversible cooperation with the flange 10 of the receptacle 6 to effectively cover the access opening 9 in either normal or inverted position. As indicated, the unitary molded pulp cover is of dome-shape with a restricted access opening 13 in one side thereof, the cover access opening 13 being formed by an integral inwardly directed flange 26. Thus when in inverted position as shown in Fig. 4, the cover 11 provides an independent receptacle for such articles as worms, crabs, helgramites or the like, or for such materials as ice for cooling purposes, and the opening-forming flange thereof aids in preventing escape or displacement of such articles or materials. To aid in manipulation of the cover 11, it may be provided with a gripping knob or upper projection 27 which also adds to the capacity of the hollow cover; and to render the cover reversible as well as for reasons to hereinafter become more apparent, the main body of the cover 11 should be of somewhat smaller diameter than the upper access opening 9 of the receptacle 6. As shown, the access opening-forming flange 10 of the receptacle 6 is provided with diametrically opposed notches 28 of slightly greater width than the thickness of the flange 12 of the cover and of greater diameter or length thereacross than the diameter of the cover flange 12 so as to permit vertical endwise passage of the cover 11 through the opening 9 and notches 28 for disposition of the cover within the receptacle 6 during periods of storage or non-use.

From the foregoing detailed description, it is believed apparent that I have provided an improved live bait container for fishermen which may be economically formed from inexpensive materials such as paper pulp to provide a highly efficient device for protectively housing and maintaining diverse baits in preserved condition. The improved live bait containers are extremely durable in construction despite the lightness thereof, and because of the extremely good insulation qualities of the material utilized and the ability of the containers to provide aeration for the contents without permitting escape of the liquid from within the container, it is unnecessary to change water at frequent intervals as in the case of the usual minnow buckets. By reason of applicant's improved structure, the cover for the receptacle 6 serves a multiple purpose in that it effectively covers the access opening 9 and also provides a secondary container for any desired articles or materials as hereinabove described. Also, the carrying means provided by the cooperating bails 14, 15 is extremely simple and highly efficient despite its simplicity primarily due to the provision of the grooves 22 and 23 and the notch 25 which prevent displacement thereof during normal use. In addition, applicant has provided a novel construction whereby the relatively fragile cover may be removed and protectively housed within the receptacle 6 during periods of non-use. The improved live bait containers have proven highly satisfactory in actual commercial use and have proven by actual use and thorough tests that live bait may be maintained in extremely good and lively condition for long periods of time.

It should be understood that it is not desired to limit this invention to the exact details of construction, or to the precise mode of use hereinabove shown and described, since various modifications within the scope of the appended claim may occur to persons skilled in the art to which this invention pertains.

I claim:

A live bait container comprising, a unitary molded pulp receptacle adapted to receive and retain a supply of water, said receptacle having a top wall provided with a restricted access opening surrounded by a recessed flange defining an outwardly open annular recess, said flange being formed with diametrically opposed slots extending from said recess to the interior of said receptacle, and a unitary hollow molded pulp cover for said receptacle having a main dome-shaped body portion of smaller diameter and less overall height than the diameter of said opening and provided with an outwardly directed annular flange of larger diameter than said opening adapted for reversible seating within said recesses and of slightly smaller diameter than the diameter defined by said opposed slots to permit passage of said cover endwise through said opening, said cover being provided with a restricted access opening defined by an internal inwardly projecting annular ridge on the side of its said flange remote from its dome whereby said cover may be used in alternate positions with its said dome projecting outwardly or inwardly of said receptacle top wall to cover the access opening of said receptacle while being positively seated in either position.

References Cited in the file of this patent

UNITED STATES PATENTS

| | | | |
|---|---|---|---|
| 170,192 | Roberts | Nov. 23, | 1875 |
| 201,066 | Stilwell | Mar. 5, | 1878 |
| 240,891 | Cook | May 3, | 1881 |
| 504,027 | Fries et al. | Aug. 29, | 1893 |
| 1,406,284 | Rockwood | Feb. 14, | 1922 |
| 2,179,095 | Kelsey | Nov. 7, | 1939 |
| 2,310,113 | Plochman | Feb. 2, | 1943 |
| 2,447,166 | Daffer | Aug. 17, | 1948 |
| 2,520,864 | Thornhill | Aug. 29, | 1950 |
| 2,630,938 | Burnett | Mar. 10, | 1953 |

FOREIGN PATENTS

| | | |
|---|---|---|
| 18,069 | Great Britain | 1897 |